United States Patent
Wu et al.

(10) Patent No.: US 9,503,191 B2
(45) Date of Patent: Nov. 22, 2016

(54) GMP MAPPING METHOD AND APPARATUS FOR OPTICAL CHANNEL DATA UNIT

(75) Inventors: Shangqing Wu, Shenzhen (CN); Tong Wang, Shenzhen (CN); Yingfei Li, Shenzhen (CN); Zhangbin Lu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 249 days.

(21) Appl. No.: 14/396,958

(22) PCT Filed: Apr. 26, 2012

(86) PCT No.: PCT/CN2012/074772
§ 371 (c)(1),
(2), (4) Date: Oct. 24, 2014

(87) PCT Pub. No.: WO2013/159314
PCT Pub. Date: Oct. 31, 2013

(65) Prior Publication Data
US 2015/0078752 A1    Mar. 19, 2015

(51) Int. Cl.
*H04J 3/02* (2006.01)
*H04B 10/27* (2013.01)
(Continued)

(52) U.S. Cl.
CPC .............. *H04B 10/27* (2013.01); *H04J 3/02* (2013.01); *H04J 3/07* (2013.01); *H04J 3/1652* (2013.01)

(58) Field of Classification Search
CPC .......... H04J 14/08; H04J 14/083; H04J 3/02; H04J 3/07; H04J 3/1652; H04Q 11/04; H04Q 11/01; H04B 10/27
See application file for complete search history.

(56) References Cited

U.S. PATENT DOCUMENTS

| 2007/0248121 A1* | 10/2007 | Zou ................... H04J 3/1611 370/498 |
| --- | --- | --- |
| 2012/0002671 A1 | 1/2012 | Xiao |
| 2012/0014270 A1 | 1/2012 | Honma |
| 2013/0058643 A1 | 3/2013 | Honma |
| 2013/0058655 A1 | 3/2013 | Okubo et al. |

FOREIGN PATENT DOCUMENTS

| CN | 101827285 A | 9/2010 |
| --- | --- | --- |
| CN | 101841741 A | 9/2010 |

(Continued)

OTHER PUBLICATIONS

International Search Report in international application No. PCT/CN2012/074772, mailed on Feb. 7, 2013.

(Continued)

*Primary Examiner* — Ted Wang
(74) *Attorney, Agent, or Firm* — Oppedahl Patent Law Firm LLC

(57) ABSTRACT

The disclosure discloses a Generic Mapping Procedure (GMP) mapping method for an Optical channel Data Unit (ODU), including: caching low-level ODUk data to a memory according to the rate of low-level ODUk data stream; generating an adjustment byte in a mapping process and encoding the adjustment byte; generating read enable of the cached data by an algorithm according to the adjustment byte, reading the cached low-level ODUk data, and generating Optical channel Data Tributary Unit (ODTU) data according to the read data; and crossing a time slot of the ODTU data in multiple channels to that of a high-level ODU payload, and forming the data in the time slot of the high-level ODU payload and the encoded adjustment byte into a completed high-level ODU frame. The disclosure may further provide a GMP mapping apparatus for an ODU. According to a technical solution of the disclosure, the GMP mapping of the ODU can be implemented according to the dynamic change of a service rate.

9 Claims, 1 Drawing Sheet

(51) Int. Cl.
   *H04J 3/16*   (2006.01)
   *H04J 3/07*   (2006.01)

(56) References Cited

FOREIGN PATENT DOCUMENTS

| CN | 101902275 A | 12/2010 |
| CN | 102098595 A | 6/2011 |
| WO | 2011135726 A1 | 11/2011 |
| WO | 2011148472 A1 | 12/2011 |

OTHER PUBLICATIONS

English Translation of the Written Opinion of the International Search Authority in international application No. PCT/CN2012/074772, mailed on Feb. 7, 2013.

International Telecommunication Union. "Interfaces for the optical transport network" G.709/Y.1331. Feb. 2012, pp. 1-227.

Supplementary European Search Report in European application No. 12875679.8, mailed on Mar. 27, 2015.

\* cited by examiner

GMP MAPPING METHOD AND APPARATUS FOR OPTICAL CHANNEL DATA UNIT

FIELD

The disclosure relates to a wire transmission technology in the field of communications, and more particularly to a Generic Mapping Procedure (GMP) mapping method and a GMP mapping apparatus for an Optical channel Data Unit (ODU).

BACKGROUND

With the rapid development of the communication technology, an Optical Transport Network (OTN), which can realize flexible scheduling and management of large-capacity services, is becoming the major technology for a backbone transport network. In order to implement the processing of a client service, the OTN provides mapping processing for various services, such as a GMP for an adaptive constant bit rate service. In the GMP solution, the distribution pattern of client data in a payload is calculated by a predetermined computation rule in real time according to the amount (Cn) of client entities in each frame period to implement the transparent transmission of client signal bit.

In the existing technology, the GMP solution has the following two specific implementation ways:

In one way, which is different from the novel GMP mapping method defined in the G. 709 protocol, firstly, a fixed distribution pattern corresponding to a predetermined client entity amount of client data which is predefined by calculating the predetermined client entity amount is acquired, and a corresponding dynamic distribution pattern is determined for the rest client entity data corresponding to the rest client entities; and secondly, the client data to be transmitted in the current frame period can be mapped according to the fixed distribution pattern and the dynamic distribution pattern.

In the other way, firstly, each low-level ODUj signal is changed into multiple parallel 8b signals, wherein the number of the parallel signals is identical with that of time slots in the Optical channel Data Tributary Unit (ODTU) occupied by the ODUj; secondly, these parallel signals are subjected to GMP mapping separately; and finally, these parallel mapping results are combined together to finish the GMP mapping from the ODUj to the ODTU, and multiple ODTUs are multiplexed to ODU4.

The essences of the two existing technical solutions are both to implement the GMP mapping according to a fixed service rate, so there is still no solution for implementing the GMP mapping according to a dynamic service rate at present.

SUMMARY

In view of this, the disclosure provides a GMP mapping method and a GMP mapping apparatus for an ODU, so as to implement the GMP mapping of the ODU according to the dynamic change of a service rate.

To this end, a technical solution of the disclosure is implemented as follows.

The disclosure provides a GMP mapping method for an ODU, including the following steps that:

low-level ODUk data is cached to a memory according to the rate of low-level ODUk data stream; moreover, an adjustment byte is generated in a mapping process and is encoded;

read enable of the cached data is generated by an algorithm according to the adjustment byte, the cached low-level ODUk data is read, and ODTU data is generated according to the read data; and a time slot of the ODTU data in multiple channels is crossed to a time slot of a high-level ODU payload, and data in the time slot of the high-level ODU payload and the encoded adjustment byte are formed into a completed high-level ODU frame.

In the method, the step that low-level ODUk data is cached to a memory according to the rate of low-level ODUk data stream may include that:

low-level ODUk data stream at various rates is de-multiplexed according to the rate and the principle of different data paths of the same rate, and the low-level ODUk data in the same data path in the de-multiplexed low-level ODUk data is written into the same memory, so as to cache the low-level ODUk data.

In the method, the step that an adjustment byte is generated in a mapping process may include that:

the size of data of n bits in a multiframe is calculated automatically for an input client signal to obtain Cn, where n is calculated automatically according to the rate of the input client signal; and the adjustment bytes Cm and Cnd are calculated, wherein Cm is obtained by adding the remainder of Cn/m in the last frame to the Cn currently calculated to obtain a sum, dividing the sum by m to obtain a quotient, and taking the integer of the quotient to obtain an integer value which is Cm; Cnd is obtained by adding the remainder of Cn/m in the last frame to the Cn currently calculated, dividing the sum by m to obtain a quotient, and taking the integer of the quotient to obtain a remainder, which is Cnd; and m is equal to a value obtained after the integer of n/8 is taken.

In the method, the step that the adjustment byte is encoded may include that:

Cm and Cnd in multiple paths are multiplexed and the adjustment bytes Cm and Cnd are encoded, wherein the multiplexing principle is that a control path where the last time slot of a high-level ODU occupied by the current service is identical with an OMFI is selected to encode the adjustment bytes in the control path.

In the method, the step that the cached low-level ODUk data is read and ODTU data is generated according to the read data may include that:

pre-cached low-level ODUk data is read from the memory by the read enable of the cached data, the read low-level ODUk data is sequenced in a descending order of m, the sequenced low-level ODUk data is taken as valid data of the ODTU data, and the invalid data of the ODTU data is filled with 0 to generate ODTU data.

In the method, the step that a time slot of the ODTU data in multiple channels is crossed to that of a high-level ODU payload may include that:

the generated ODTU data in multiple channels is subjected to time slot crossing processing by a 16-classification method, and a time slot of the ODTU data in the multiple channels is crossed to the time slot of a high-level ODU payload.

In the method, the 16-classification method may include that:

ODUk data stream at a rate of 1-80 time slots is classified into 16 types when lossless switching is ensured for the service, and the 16 types are mapped separately; and the classification is carried out according to the principle that those with the identical path number are classified into one type.

In the method, the process that the classification is carried out according to the principle that those with the identical path number are classified into one type may include that:

if the number of time slots occupied by the rate is L, the integer of quotient of 80/L is the number of paths, i.e. the path number, wherein L is in the range of 1-80; and the rates of L corresponding to the same value belong to one type after the integer of 80/L is taken.

The disclosure may further provide a GMP mapping apparatus for an ODU, including:

a processing unit, which is configured to cache low-level ODUk data to a memory according to the rate of low-level ODUk data stream;

a memory, which is configured to cache the low-level ODUk data;

a first generation unit, which is configured to generate an adjustment byte in a mapping process during the operation of the processing unit;

an encoding unit, which is configured to encode the adjustment byte;

a calculation unit, which is configured to generate read enable of the cached data by an algorithm according to the adjustment byte;

a second generation unit, which is configured to read the cached low-level ODUk data according to the read enable of the cached data, and generate ODTU data according to the read data;

a time slot crossing unit, which is configured to cross a time slot of the ODTU data in multiple channels to a time slot of a high-level ODU payload; and a framing unit, which is configured to form data in the time slot of the high-level ODU payload and the encoded adjustment byte into a complete high-level ODU frame.

According to the GMP mapping method and the GMP mapping apparatus for the ODU provided in the disclosure, low-level ODUk data is cached to a memory according to the rate of low-level ODUk data stream; moreover, an adjustment byte is generated in a mapping process and is encoded; the read enable of the cached data is generated by an algorithm according to the adjustment byte, the cached low-level ODUk data is read, and ODTU data is generated according to the read data; and a time slot of the ODTU data in multiple channels is crossed to that of a high-level ODU payload, and data in the time slot of the high-level ODU payload and the encoded adjustment byte are formed into a completed high-level ODU frame. Therefore, corresponding ODTU data can be generated according to the dynamic change of a service rate, and the time slot of the ODTU data is crossed to a high-level ODU to form a high-level ODU frame and implement the GMP mapping of the ODU.

DETAILED DESCRIPTION

The basic idea of the disclosure is that: low-level ODUk data is cached to a memory according to the rate of low-level ODUk data stream; moreover, an adjustment byte is generated in a mapping process and is encoded; the read enable of the cached data is generated by an algorithm according to the adjustment byte, the cached low-level ODUk data is read, and the ODTU data is generated according to the read data; and a time slot of the ODTU data in multiple channels is crossed to that of a high-level ODU payload, and the data in the time slot of the high-level ODU payload and the encoded adjustment byte are formed into a completed high-level ODU frame.

The disclosure is further described below with reference to the accompanying drawings and embodiments in detail.

Figure 1:
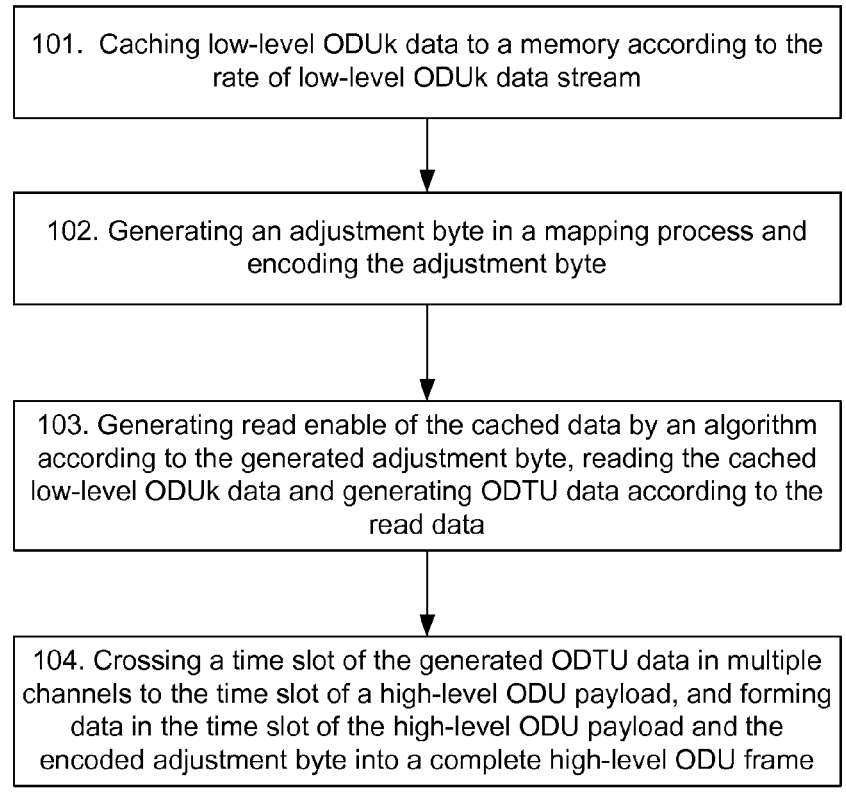
FIG. 1 is a diagram showing the flow of a GMP mapping method for an ODU.

The disclosure provides a GMP mapping method for an ODU. FIG. 1 is a diagram showing the flow of a GMP mapping method for an ODU. As shown in FIG. 1, the method includes the following steps.

Step 101: Low-level ODUk data is cached to a memory according to the rate of low-level ODUk data stream.

Specifically, a technical solution of the disclosure is applied to the GMP mapping from low-level ODUk to high-level ODU. The low-level ODUk may be ODU0 with the minimum compatibility and at a rate of 1.25G, or ODU1, ODU2, ODU3, ODU3e, ODUflex etc. at a rate of 1-80 time slots; and the high-level ODU may be ODU4, the maximum time slot of which is 80. If the high-level ODU is other ODUs, the maximum time slot may not be 80 and is determined according to a service rate. For example, the maximum time slot of ODU3 is 32. Here, the low-level ODUk and the high-level ODU may also be relative to each other. For example, when the low-level ODUk is ODU1 or ODU2, the high-level ODU may be ODU3 or others.

Firstly, a de-multiplexing unit de-multiplexes low-level ODUk data stream at various rates according to a rate and the principle of different data paths of the same rate, and distributes the de-multiplexed low-level ODUk data to multiple processing units; and each processing unit writes low-level ODUk data in the same data path in the received low-level ODUk data into the same memory to cache the low-level ODUk data, wherein the adopted memory may be a First Input First Output (FIFO) data register. Here, the number of the processing units depends on the maximum data path number of the low-level ODUk data stream and service span processing capability of each data path when the granule is the minimum, therefore, it can be ensured that during data switching of several time slots, services at other time slots would not be affected.

Step 102: An adjustment byte is generated in a mapping process and is encoded.

Specifically, it is necessary to generate an adjustment byte required in a mapping process in Step 101. The adjustment byte in the GMP mapping process is implemented by Cn. A first generation unit automatically calculates the size of data of n bits in a multiframe for an input client signal to obtain Cn, wherein n represents the minimum granule and its unit is bit, and n is automatically calculated according to the rate of the input client signal. Here, Cn is generated by a control path which is independent from the data channel, and the clock of the control path is higher than the data channel. Moreover, a data bit width corresponding to services of the same type is small, so the smaller the calculated n is, the fewer the jitter is. For example, when various ODUk data is subjected to hybrid processing, generally, the initial processing (such as an overhead processing) may include bus multiplexing, and ODUk data at various rates is multiplexed to data buses of the same bit width, so that the jitter of low-level ODUk data at a small rate may be accumulated in the multiplexing process. For example, the data bit width of data channel of ODU2 data is 256b, so the jitter of data stream is an integral multiple of 256b in a multiframe period, namely, jitter occurs each time it is accumulated to 256b; while the data bit width of the control path is 16b, so the jitter is an integral multiple of 16b. The Cn calculated like this may reduce the jitter greatly and can prevent multiplexing buses at various rates from causing jitter in such processes as mapping and overhead processing. After completing the calculation of Cn, the first generation unit calculates m according to the number of time slots of high-level ODU occupied by the current service and calculates an adjustment byte according to m and the calculated Cn, where m is the number of bits in a single adjustment, the adjustment byte includes the number Cm of bytes in a single adjustment and an accumulated value Cnd. the currently calculated Cn is added with the remainder of Cn/m in the last frame to obtain a sum which is divided by m to obtain a quotient, and the integer of the quotient is taken to obtain Cm; and the currently calculated Cn is added with the remainder of Cn/m in the last frame to obtain a sum which is divided by m to obtain a quotient, and the integer of the quotient is taken to obtain a remainder, which is Cnd, where m is equal to a value obtained after the integer of n/8 is taken.

An encoding unit encodes the adjustment bytes Cm and Cnd, wherein the encoding method refers to the method in the G.709 protocol. By the method, Cms of the front frame and the back frame are compared to obtain six comparison results: −2, −1, 0, 1, 2, more than 2 or less than −2; and encoding is carried out according to the six comparison results, with the encoding principle as shown in Table 1, in which I represents that the corresponding bit of Cm turns, U represents that the corresponding bit does not turn. In Table 1, C1-C14 represent bits of the Cm in a descending sequence, II represents increasing indication, and DI represents a descending indication.

and sequences the read low-level ODUk data in a descending order of m, and the sequenced low-level ODUk data is taken as valid data of the ODTU data, and the invalid data of the ODTU data is filled with 0 to generate ODTU data.

Therefore, valid data and invalid data are filled based on m, and according to the configured m value, the reading of data in the memory and the generation of corresponding ODTU data are controlled by change of m. Dynamically generating the ODTU data achieves a good universal effect on the universality between different single paths and plays a key role on the reduction of resources for integrally implementing the hybrid mapping of services at various rates.

Step 104: A time slot of the ODTU data in multiple channels is crossed to that of a high-level ODU payload, and data in the time slot of the high-level ODU payload and the encoded adjusted byte are formed into a completed high-level ODU frame.

Specifically, a time slot crossing unit crosses the time slot of the generated ODTU data in multiple channels to cross a time slot of the ODTU data in the multiple channels to that of a high-level ODU payload. For example, if the high-level ODU is ODU4, ODTU4 data with a unit of path is crossed to time slots of 80 payloads of ODU4. The low-level ODUk data stream is large in rate span and is in a rate range of 1-80, and the time slot crossing implements the crossing of any service, so that a 16-classification method is adopted in the disclosure to implement the time slot crossing with a path/byte as a unit and can reduce the scale of the time slot crossing; moreover, such time slot crossing is favourable for the mapping of one channel instead of one single time slot and can prevent a synchronous problem from occurring in the time slot mapping. The 16-classification method is that ODUk data stream at a rate of 1-80 time slots is classified

TABLE 1

| C1 | C2 | C3 | C4 | C5 | C6 | C7 | C8 | C9 | C10 | C11 | C12 | C13 | C14 | II | DI | Change |
|---|---|---|---|---|---|---|---|---|---|---|---|---|---|---|---|---|
| U | U | U | U | U | U | U | U | U | U | U | U | U | U | 0 | 0 | 0 |
| I | U | I | U | I | U | I | U | I | U | I | U | I | U | 1 | 0 | +1 |
| U | I | U | I | U | I | U | I | U | I | U | I | U | I | 0 | 1 | −1 |
| U | I | I | U | U | I | I | U | U | I | I | U | U | I | 1 | 0 | +2 |
| I | U | U | I | I | U | U | I | I | U | U | I | I | U | 0 | 1 | −2 |
| Binary value | | | | | | | | | | | | | | 1 | 1 | More than +2 or less than −2 |

Because there may be many control paths when the granule is the minimum, Cm and Cnd of the multiple paths are multiplexed at first and then are encoded by one encoding unit. The multiplexing principle is that a control path where the last time slot of the high-level ODU occupied by the current service is identical with an OMFI is selected to encode the adjustment byte in the control path, so that encoding resources can be saved greatly.

Step 103: Read enable of the cached data is generated by an algorithm according to the generated adjustment byte, the cached low-level ODUk data is read, and the ODTU data is generated according to the read data.

Specifically, a calculation unit generates the read enable of the cached data by an algorithm according to the generated adjustment byte Cm and the high-level ODU frame header provided by a framing unit. Here, a Sigma/Delta algorithm can be adopted. A second generation unit reads pre-cached low-level ODUk data from a memory by the read enable of the cached data calculated by the calculation unit into 16 types when lossless switching is ensured for the service and the 16 types are mapped separately. The classification is according to the principle of classifying those with the identical path number into one type, specifically: if the number of time slots occupied by the rate is L, the integer of 80/L is the path number, where L is in the range of 1-80, that is to say, the rates of the L size corresponding to the identical values after the integer of 80/L is taken as one type.

A framing unit takes the encoded adjustment byte as an overhead to form a complete high-level ODU frame with the data in the time slot in the high-level ODU payload. For example, for ODU4, the framing unit forms a complete ODU4 frame from data in 80 time slots in ODU4 payload and the encoded adjustment byte as an overhead.

Through the technical solution provided by the disclosure, low-level ODUk at any rate lower than that of ODU4 can be mapped to ODU4, wherein ODUk is high in compatibility and span and compatible with ODU0 at the minimum rate of 1.25G and supports ODU1, ODU2, ODU3, ODU3e and ODUflex etc.; moreover, it may further support lossless switching of a service. In addition, services at different rates are multiplexed to reduce resources, for example, services at a rate of 41-80 time slots of low-level ODUk can be multiplexed with a small unit, and a corresponding service can be mapped only by setting the size of the service in the range of 41-80. Furthermore, for the multiplexing in the rate range of 27-40, ODU3 at a rate of 31 time slot can be well multiplexed with ODU3e at a rate of 33 time slots; moreover, high accurate Cn may be further generated, wherein Cn which is generated with a uniform notch signal of a high clock is statistically generated independent from a data channel, so as to prevent multiplexing buses at various rates from causing jitter in such processes as mapping and overhead processing. Here, 672.16M clock is utilized for the generation of Cn; and one time slot corresponds to a bit width of 2b, so that the accuracy of jitter can reach 2b minimally and the accuracy is high. For a service of n time slots, the accuracy can reach 2*n and may further increase with the increase of the clock frequency; moreover, the signal to be calculated is a notch signal, the calculation of which is independent from data stream and involves small resources to be computed and has high portability, wherein the notch signal represents a valid signal of a service rate, i.e. VALID, which is generally a single bit, wherein a high level represents valid and a low level represents invalid, therefore, the higher proportion the high level has, the higher the rate is.

Figure 2:
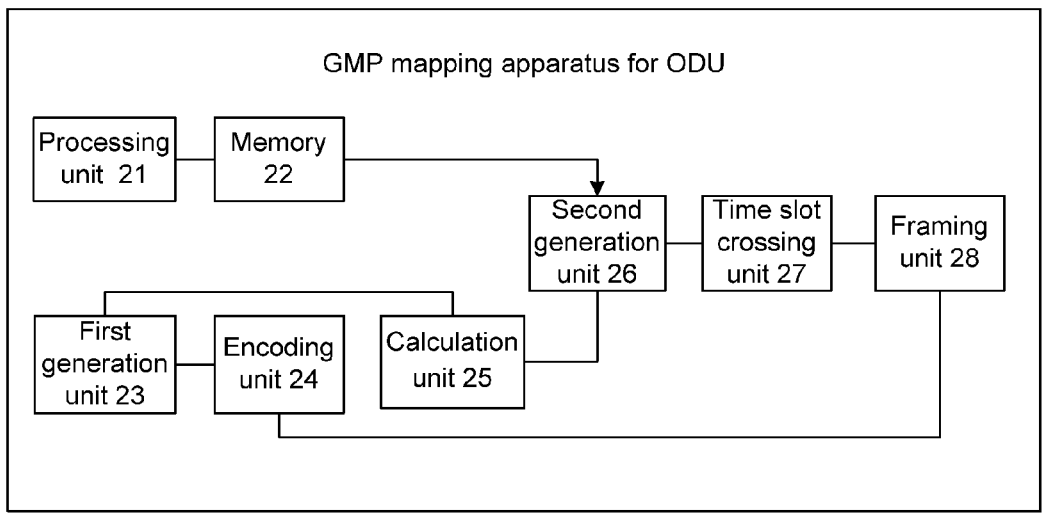
FIG. 2 is a diagram showing the structure of a GMP mapping apparatus for an ODU.

In order to implement the method, the disclosure further provides a GMP mapping apparatus for an ODU. FIG. 2 is a diagram showing the structure of a GMP mapping apparatus for an ODU. As shown in FIG. 2, the apparatus includes:

a processing unit 21, which is configured to cache low-level ODUk data to a memory according to the rate of low-level ODUk data stream;

a memory 22, which is configured to cache the low-level ODUk data;

a first generation unit 23, which is configured to generate an adjustment byte in a mapping process during the operation of the processing unit 21;

an encoding unit 24, which is configured to encode the adjustment byte;

a calculation unit 25, which is configured to generate read enable of the cached data by an algorithm according to the adjustment byte;

a second generation unit 26, which is configured to read the cached low-level ODUk data according to the read enable of the cached data, and generate ODTU data according to the read data;

a time slot crossing unit 27, which is configured to cross a time slot of the ODTU data in multiple channels to that of a high-level ODU payload; and a framing unit 28, which is configured to form data in the time slot of the high-level ODU payload and the encoded adjustment byte into a complete high-level ODU frame.

The process that the processing unit 21 caches the low-level ODUk data to the memory according to the rate of the low-level ODUk data stream may include that: low-level ODUk data streams at various rates are de-multiplexed according to the rates and the principle of different data paths of the same rate, and the low-level ODUk data in the same data path in the de-multiplexed low-level ODUk data is written into the same memory to cache the low-level ODUk data.

The process that the first generation unit 23 generates an adjustment byte in a mapping process may include that: the size of data of n bits in a multiframe is calculated automatically for an input client signal to obtain Cn, where n is calculated automatically according to the rate of the input client signal; and adjustment bytes Cm and Cnd are calculated, wherein Cm is obtained by adding the remainder of Cn/m in the last frame to currently calculated Cn, dividing the sum by m, and taking the integer of the quotient to obtain an integer, which is Cm, Cnd is obtained by adding the remainder of Cn/m in the last frame to the currently calculated Cn, dividing the sum by m, and taking the integer of the quotient to obtain a remainder, which is Cnd; and m is equal to a value obtained after the integer of n/8 is taken.

The process that the encoding unit 24 encodes the adjustment byte may include that: Cm and Cnd in multiple paths are multiplexed and the adjustment bytes Cm and Cnd are encoded, wherein the multiplexing principle is that a control path where the last time slot of a high-level ODU occupied by the current service is identical with an OMFI is selected to encode the adjustment byte in the control path.

The process that the second generation unit 26 reads the cached low-level ODUk data and generates ODTU data according to the read data may include that: pre-cached low-level ODUk data is read from the memory by the read enable of the cached data, the read low-level ODUk data is sequenced in a descending order of m, the sequenced low-level ODUk data is taken as valid data of the ODTU data, and the invalid data of the ODTU data is filled with 0 to generate ODTU data.

The process that the time slot crossing unit 27 crosses the time slot of ODTU data in multiple channels to the time slot of the high-level ODU payload may include that: the generated ODTU data in multiple channels is subjected to time slot crossing by a 16-classification method, and a time slot of the ODTU data in multiple channels is crossed to the time slot of a high-level ODU payload.

The above are only the embodiments of the disclosure, and not intended to limit the scope of protection of the disclosure, and any modifications, equivalent replacements, improvements and the like within the spirit and principle of the disclosure shall fall within the scope of protection of the claims of the disclosure.

What is claimed is:

1. A Generic Mapping Procedure (GMP) mapping method for an Optical channel Data Unit (ODU), comprising:

caching low-level ODUk data to a memory according to a rate of low-level ODUk data stream, and generating an adjustment byte in a mapping process and encoding the adjustment byte;

generating read enable of the cached data by an algorithm according to the adjustment byte, reading the cached low-level ODUk data, and generating Optical channel Data Tributary Unit (ODTU) data according to the read data; and crossing a time slot of the ODTU data in multiple channels to a time slot of a high-level ODU payload, and forming data in the time slot of the high-level ODU payload and the encoded adjustment byte into a completed high-level ODU frame.

2. The method according to claim 1, wherein the caching low-level ODUk data to a memory according to a rate of low-level ODUk data stream comprises:

de-multiplexing low-level ODUk data stream at various rates according to a rate and a principle of different data paths of a same rate, and writing the low-level ODUk data in a same data path into the de-multiplexed low-level ODUk data to a same memory, so as to cache the low-level ODUk data.

3. The method according to claim 1, wherein the generating an adjustment byte in a mapping process comprises:
automatically calculating a size of data of n bits in a multiframe for an input client signal to obtain Cn, where n is calculated automatically according to a rate of the input client signal; and
calculating adjustment bytes Cm and Cnd; obtaining Cm by adding a remainder of Cn/m in a last frame to the Cn currently calculated to obtain a sum and then dividing the sum by m to obtain a quotient, and taking an integer of the quotient to obtain an value which is Cm; obtaining Cnd by adding a remainder of Cn/m in a last frame to the Cn currently calculated to obtain a sum, dividing the sum by m to obtain a quotient, and obtaining a remainder which is Cnd after taking an integer of the quotient; wherein m is equal to a value obtained after an integer of n/8 is taken.

4. The method according to claim 1, wherein the encoding the adjustment byte comprises:
multiplexing Cm and Cnd in multiple paths and encoding the adjustment bytes Cm and Cnd, wherein a multiplexing principle is that a control path where a last time slot of a high-level ODU occupied by a current service is identical with an Optical Channel Payload Unit Multi-frame Identifier (OMFI) is selected to encode the adjustment bytes in the control path.

5. The method according to claim 1, wherein the reading the cached low-level ODUk data and generating ODTU data according to the read data comprises:
reading pre-cached low-level ODUk data from the memory by the read enable of the cached data, sequencing the read low-level ODUk data in a descending order of m, taking the sequenced low-level ODUk data as valid data of the ODTU data, and filling invalid data of the ODTU data with 0 to generate ODTU data.

6. The method according to claim 1, wherein the crossing a time slot of the ODTU data in multiple channels to a time slot of a high-level ODU payload comprises:
performing time slot crossing on the generated ODTU data in the multiple channels by a 16-classification method, and crossing the time slot of the ODTU data in the multiple channels to the time slot of the high-level ODU payload.

7. The method according to claim 6, wherein the 16-classification method comprises:
classifying ODUk data stream at a rate of 1-80 time slots into 16 types when lossless switching is ensured for a service, and mapping the 16 types separately, wherein the classification is carried out according to a principle of classifying those with an identical path number into one type.

8. The method according to claim 7, wherein the principle of classifying those with an identical path number into one type is that:
if the number of time slots occupied by a rate is L, an integer of a quotient of 80/L is a path number, wherein L is in a range of 1-80, and rates of L corresponding to a same value belong to one type after the integer of 80/L is taken.

9. A Generic Mapping Procedure (GMP) mapping apparatus for an Optical channel Data Unit (ODU), comprising:
a processing unit, which is configured to cache low-level ODUk data to a memory according to a rate of low-level ODUk data stream;
a memory, which is configured to cache the low-level ODUk data;
a first generation unit, which is configured to generate an adjustment byte in a mapping process during operation of the processing unit;
an encoding unit, which is configured to encode the adjustment byte;
a calculation unit, which is configured to generate read enable of the cached data by an algorithm according to the adjustment byte;
a second generation unit, which is configured to read the cached low-level ODUk data according to the read enable of the cached data, and generate ODTU data according to the read data;
a time slot crossing unit, which is configured to cross a time slot of the ODTU data in multiple channels to a time slot of a high-level ODU payload; and
a framing unit, which is configured to form data in the time slot of the high-level ODU payload and the encoded adjustment byte into a complete high-level ODU frame.

* * * * *